United States Patent
Meabe Zabala et al.

(10) Patent No.: US 10,336,154 B2
(45) Date of Patent: Jul. 2, 2019

(54) STABILIZER LINK FOR AUTOMOBILE SUSPENSIONS

(71) Applicant: ENGINEERING DEVELOPMENTS FOR AUTOMOTIVE INDUSTRY, S.L., Bizkaia (ES)

(72) Inventors: Jon Meabe Zabala, Bizkaia (ES); Rubén Gutierrez de la Pisa, Bizkaia (ES); Erik Ugarte Duo, Bizkaia (ES)

(73) Assignee: ENGINEERING DEVELOPMENTS FOR AUTOMOTIVE INDUSTRY, S.L. (ES)

( * ) Notice: Subject to any disclaimer, the term of this patent is extended or adjusted under 35 U.S.C. 154(b) by 0 days.

(21) Appl. No.: 15/945,267

(22) Filed: Apr. 4, 2018

(65) Prior Publication Data

US 2018/0297439 A1    Oct. 18, 2018

(30) Foreign Application Priority Data

Apr. 5, 2017   (EP) ..................... 17382179

(51) Int. Cl.
*B60G 21/055* (2006.01)
*B60G 7/00* (2006.01)

(52) U.S. Cl.
CPC ........... *B60G 21/055* (2013.01); *B60G 7/001* (2013.01); *B60G 7/005* (2013.01); *B60G 2202/135* (2013.01); *B60G 2204/1224* (2013.01); *B60G 2204/416* (2013.01); *B60G 2206/00* (2013.01); *B60G 2206/11* (2013.01); *B60G 2206/7104* (2013.01); *B60G 2206/8209* (2013.01)

(58) Field of Classification Search
CPC ........... B60G 21/055; B60G 2202/135; B60G 2206/00
See application file for complete search history.

(56) References Cited

U.S. PATENT DOCUMENTS

| 4,429,899 A | * | 2/1984 | Ohno | B60G 21/055 138/109 |
| 5,313,697 A | * | 5/1994 | Kanno | B60S 1/24 29/469.5 |
| 6,691,366 B1 | * | 2/2004 | Zimmer | B60S 1/245 15/250.14 |

(Continued)

FOREIGN PATENT DOCUMENTS

| DE | 3843330 | 7/1990 |
| DE | 102010041791 | 4/2012 |

(Continued)

*Primary Examiner* — Darlene P. Condra
(74) *Attorney, Agent, or Firm* — Garvey, Smith & Nehrbass, Patent Attorneys, L.L.C.; Seth M. Nehrbass; Julie R. Chauvin

(57) ABSTRACT

The present invention relates to a stabilizer link for automobile suspensions, comprising:
   a tubular body (1), having at one end a pair of first flattened areas (2, 2') configuring a leak-tight closure of a first inner cavity (9) of the tubular body (1) located between both flattened areas (2, 2'); and
   a first covering (4) made of polymeric material coupled, during the forming process thereof, on the end of the tubular body (1) such that it surrounds the pair of first flattened areas (2, 2'), and wherein said covering (4) comprises a first articulation (6).

14 Claims, 3 Drawing Sheets

(56) References Cited

U.S. PATENT DOCUMENTS

| | | | | |
|---|---|---|---|---|
| 2006/0076750 A1* | 4/2006 | Sundgren | ............. | B60G 21/055 280/124.107 |
| 2008/0193208 A1* | 8/2008 | Nordloh | ................ | B22D 19/12 403/135 |
| 2017/0313154 A1* | 11/2017 | Kuroda | ................ | B60G 21/055 |
| 2018/0154732 A1* | 6/2018 | Mosteiro Goyoaga | ...................... | B60G 21/055 |

FOREIGN PATENT DOCUMENTS

| | | | | |
|---|---|---|---|---|
| EP | 0690242 | | 1/1996 | |
| EP | 2857234 A1 | * | 4/2015 | ............. B60G 7/001 |
| FR | 2670255 | | 6/1992 | |
| WO | 2013050219 | | 4/2013 | |

* cited by examiner

STABILIZER LINK FOR AUTOMOBILE SUSPENSIONS

CROSS-REFERENCE TO RELATED APPLICATIONS

Priority of European Patent Application Serial No. 17382179.4, filed 5 Apr. 2017, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

Technical Field of the Invention

The present invention relates to a stabilizer link for automobile suspensions comprised in the automotive sector and specifically in the function of the suspension system of the automobile itself.

The main purpose of the stabilizer link for automobile suspensions object of the invention is to be able to assure a secure and reliable attachment between the automobile wheel suspension and the stabilizer bar associated with the automobile suspension system, such that oscillations due to uneven ground and centrifugal forces are immediately transmitted from the wheel to said stabilizer bar in a controlled manner and with maximum security in order to prevent unwanted breakages or failures in the kinematic chain of the participating links. Furthermore, the stabilizer link must have a series of simple physical entities which reduce manufacturing process- and commissioning-related cost compared with the current state of the art, and all this with a simple, flexible and very versatile device so that it can be coupled to the multiple configurations of different automobile suspensions.

General Background of the Invention

By way of introduction, an automobile has two clearly differentiated suspension systems, on one hand, the suspension system of the front axle, which has an independent suspension system, where each oscillating movement of each front wheel is dampened and absorbed through the spring and shock absorber suspension system in each wheel, due to the front axle having the steering system and the movements of one wheel not being able to be transmitted to another as it would cause losing control over the automobile in question. In contrast, the rear axle can have three different types of suspension: a rigid suspension system, where both wheels of the rear axle are connected together to the chassis, such that the oscillating movement of one of the wheels is transmitted in its entirety to the opposite wheel of the same rear axle; an example of this type of suspension is the leaf-spring suspension characteristic of heavy vehicles. On the other hand, there are semi-independent suspension systems which are the most widely used systems in front-wheel drive vehicles, where said suspension system allows absorbing and reducing part of the oscillating movement of one of the wheels towards the opposite wheel within the same rear axle; an example of this type of suspension is torsion-beam suspension. Finally, the independent rear axle system which is extremely common in rear-wheel drive automobiles and makes each oscillating movement of each rear wheel independent is known, where examples of this type of suspension are the trailing-arm suspension, deformable parallelogram suspension, multi-link suspension, revo-knuckle suspension, etc.

There is a stabilizer bar associated with all the suspension systems described for the front and rear axles, said stabilizer bar being a type of bar the main purpose of which is to bring together the vertical oscillating movement of the wheels of one and the same axle, thereby minimizing the lateral tilt the body of the vehicle experiences when it is subjected to a lateral acceleration force (normally in curves). The stabilizer bar thereby transfers part of the compressive force of the wheel outside the curve to the inside wheel, reducing compression of the outside wheel, and therefore helping to achieve less tilt of the body of the automobile.

In this sense, and associated with the proposed invention itself, the use of links or suspension arms in charge of serving as an attachment between said stabilizer bar and the suspension of each of the wheels of the same axle is known, such that said attachment must assure a high degree of flexibility due to the relative movements existing between the wheel itself, the associated suspension system thereof, and the stabilizer bar itself, and said attachment must be rigid enough to withstand such oscillations as well as to perfectly transmit the compression of the outside wheel to the inside wheel until minimum body roll is achieved, increasing stability of the automobile as it goes around a curve.

Said stabilizer links are usually manufactured from a single metallic or plastic body which has at its ends a pair of articulations, which can be ball and socket joints, to be coupled, on one hand, to the suspension of the wheel of an axle, and on the other hand, to the stabilizer bar, such that if the body is made of metal the manufacture and forming of said body requires a series of shearing, punching, deep-drawing and/or bending tools to assure a predefined dimension between supporting points, as well as the subsequent coupling of the corresponding articulations for joining the wheel and the suspension system, where said manufacture has a high degree of complexity as it uses a metallic material which requires a series of specific tools to that end, and furthermore where the link thus obtained is heavier compared with manufacturing it from other lighter materials.

To solve said problems, the manufacture and forming of stabilizer links from a plastic material, generally a thermoplastic-type material, is known such that the forming process is simplified as a result of using a series of suitable molds for the different lengths of support between the wheel and the suspension system, and the weight of the assembly is also reduced a priori since the density of plastics of this type is less than the density of the metallic materials used. However, it in turn has a series of drawbacks relating to both the reduction of the bearing capacity of the stabilizer link, since metallic materials perform better against mechanical deformation forces caused by the vertical movements of the wheels, and the attainment of a wide range of link manufacturing lengths, since a different mold must be formed for each length, therefore making the manufacture thereof more expensive.

For this reason and in view of the problems relating to both the manufacture of stabilizer links for different automobile configurations and the compromise between having a low weight and a high mechanical strength, there is a need for a new stabilizer link capable of solving the preceding problems, such that it requires a simple manufacture using standard tools that do not entail a high extra acquisition, use and maintenance cost, that furthermore has a reduced weight and ideal mechanical characteristics for the application in which it is comprised, all with a stabilizer link formed by simple entities, perfectly capable of being adapted to different varieties of automobile suspension, and novel with respect to the state of the art known today.

BRIEF SUMMARY OF THE INVENTION

The present invention relates to a stabilizer link for automobile suspensions configured for acting as an articulated attachment between a stabilizer bar and the suspension system associated with a wheel of the automobile, such that said link comprises:

- a tubular body which has at least one pair of first flattened areas configuring a leak-tight closure of the inner cavity of the tubular body located between both flattened areas;
- at least one polymeric covering coupled, during the forming process, on the first flattened areas of said tubular body through the covering surrounding said pair of first flattened areas, and wherein said covering comprises an articulation configured for being coupled either to the stabilizer bar or to the suspension system.

Two particular embodiments of said invention are described below:

In a first embodiment, the preferred option in which the first flattened areas are located at one of the ends of said tubular body stands out.

In a second embodiment, the tubular body has, in addition to first flattened areas which are located at one of the ends of said tubular body, second flattened areas located at the opposite end of said tubular body and configuring three leak-tight inner cavities of the tubular body:

- a first inner cavity of the tubular body located between the first flattened areas;
- a second inner cavity of the tubular body located between the second flattened areas; and
- a third inner cavity of the tubular body located between a first flattened area located at one of the ends and a second flattened area located at the opposite end.

Two flattened areas can thus be made for each end of the tube, one at the end itself and another in the proximities thereof, such that new inner cavities are generated increasing the tightness capacity and durability of the stabilizer link object of the invention, as well as the grip of the polymeric coverings configured on said flattened areas.

Two embodiments of the flattened areas of the tubular body of the link are thus described, but where both flattened areas share the fact that at least a first polymeric covering is coupled on one end, for subsequently positioning on the polymeric covering the respective articulation for attachment between the stabilizer bar and the suspension system of the vehicle.

The possibility of there being a third flattened area and a fourth flattened area configuring, respectively, a fourth inner cavity and a fifth inner cavity, arranged respectively between the first flattened areas defined in the first embodiment and the third flattened area, and between the second flattened areas defined in the second embodiment and the fourth flattened area, is likewise contemplated.

There is the possibility of the flattened areas being located in the proximities of the end of the tubular body but leaving the end of said tubular body non-flattened. In this case, it can be seen that the flattened areas are not made at the actual end of the tubular body as such, but are made in a position close to the end but leaving the actual end non-flattened, where the arrangement of the flattened areas is defined according to the load of the vehicle in which the stabilizer links objects of the invention are to be installed.

As regards the coupling of the polymeric coverings coupled on the flattened areas, the preferred option in which at least one flattened area has at least one through hole, and wherein the polymeric covering arranged on said flattened area is coupled surrounding said through hole of said flattened area stands out.

It is necessary to clarify that said polymeric coverings coupled to the flattened areas of the tubular body are coupled thereto as a result of the polymeric coverings surrounding said flattened areas, and particularly due to said at least one hole of the flattened area, since said hole allows the polymeric material of the covering to flow therethrough, such that a physical attachment is created between respective entities when it solidifies.

The possibility of performing machining at one or both ends of the tubular body is also considered in order to improve the grip between the polymeric coverings and the tubular body, said machining being able to consist of shot-blasting, sand-blasting or any other similar process increasing the roughness of the tubular body and favoring adhesion and tensile strength of the mentioned coverings.

It is therefore observed that the stabilizer link object of the invention is a heterogeneous, hybrid link as it is formed by two different materials: a first material associated with the tubular body, which can be of the metallic type, for example, aluminum, and a second polymeric material associated with the polymeric covering. The following advantages associated with said heterogeneity of the entities are thereby achieved:

First, the tubular body must have a high bearing capacity with respect to the link object of the invention, and for this reason in addition to a tubular geometry, which is perfect for withstanding high stresses, said tubular body has a pair of flattened areas configured for providing the weakest section, the ends or the proximities thereof, with greater thickness as they are superimposed due to flattening, achieving a thickness equal to or considerably less than twice the thickness of the non-flattened tubular profile.

Second, providing flattened areas at both ends creates a leak-tight closure of the inside of the tubular body, such that it prevents the polymeric material of the corresponding polymeric coverings, if there is a covering at each end, or water or external agents that may cause corrosive reactions deteriorating the link as such, from accumulating and forming inner deposits.

Third, the polymeric coverings are in charge of housing the articulations for attachment between the stabilizer bar and the suspension system of each wheel, so they require a particular geometry in order to adapt to said articulation, and as a result of them being manufactured from polymeric material, two polymeric coverings can be formed for each link as a result of a single mold, for the case of symmetrical coverings, simplifying manufacture and reducing its costs substantially.

Fourth, and as a result of the different materials forming the link object of the invention, the total weight of the link is much smaller than that of links known in the state of the art, since compared with metallic links, the new link does not have metallic material at the ends intended for coupling the articulations, but rather polymeric material, and compared with plastic links, these must be solid or have great thicknesses to achieve high mechanical capacity, but in the new link since the body is made of a different, metallic-type material, the total thickness and thereby the dimensions of the link are reduced, increasing its mechanical properties.

Finally, great implementation flexibility is observed in different automobiles in which installation is to be performed, since only the length of the central body has to be modified in order to modify the length between the articulations of the link itself, without having to create new molds or special tools that require extra manufacturing cost, since the polymeric coverings have predefined measurements that do not need to be modified.

In order to improve the coupling of the articulations housed in the polymeric coverings, it is possible to first house in said coverings a slide bushing on which the articulation will be arranged a posteriori.

As a result of the adaptation capacity of the polymeric material of the coverings that are located at the ends of the stabilizer link, the articulations housed in said coverings can be of the ball and socket joint type, silent-block type, elastic type, or any other types known in the state of the art.

In order to increase the binding between the polymeric coverings and the tubular body, another option is described in which the tubular body has at least one perimetral groove configured for being surrounded by a polymeric covering, and where said perimetral groove is located in the proximities of the flattened areas of said tubular body, increasing the binding surface of the polymeric covering under compression and traction with respect to the tubular body. This is a very simple solution to be made on the tubular body itself before the coupling of the polymeric covering.

Similarly, the implementation possibility in which the tubular body has at at least one of its ends a concave recess configured for improving the coupling of the articulation is contemplated.

In this sense, a process of manufacturing the stabilizer link for automobile suspensions is described, wherein said process comprises the following steps:
a) cutting a tubular body to a predetermined length;
b) making at least one pair of flattened areas on said tubular body until obtaining a leak-tight closure of the inner cavity of the tubular body;
c) coupling a mold covering said flattened areas of the tubular body, wherein said mold has an inner cavity suitable for being filled with a polymeric material;
d) pouring the polymeric material into said mold, said polymeric material surrounding the pair of flattened areas;
e) removing the mold once the polymeric material therein solidifies, giving rise to a polymeric covering at the end where the flattened areas are located; and
f) coupling an articulation in the polymeric covering, configured for being coupled either in the stabilizer bar or in the suspension system.

A very simple forming process having a reduced number of steps and not requiring welding operations that may make said manufacture more expensive compared with the manufacture of metallic links with associated articulations is thereby observed.

It must be pointed out that the polymeric covering has been described as being coupled to the flattened areas of the tubular body, but there is a need to clarify that it may be possible to use a single polymeric covering which is coupled to the flattened areas of the tubular body, covering part or all of the outer surface of said tubular body, for which reason the option in which the polymeric coverings form a single body surrounding at least part of the outer surface of the tubular body is considered, this being a perfectly feasible solution contained in the description of the main entities described at the beginning of this section of the specification.

In this sense, and in association with the process of manufacturing the stabilizer link for automobile suspensions described above, the option in which the mold covers the entire the outer surface of the tubular body in step c), resulting in the polymeric coverings forming a single body surrounding said outer surface of the tubular body, is contemplated.

As regards the different orientations the articulations may have with respect to one another, given that the spatial points of attachment between the stabilizer bar and the suspension system of each wheel can vary greatly according to the type of automobile, the following manufacturing and design options are contemplated, wherein:

Each pair of flattened areas defines a flattening plane, wherein said planes are parallel to one another; or wherein each pair of flattened areas defines a flattening plane, wherein said planes are tilted at a specific angle with respect to one another, such that the orientation of said flattening planes must be defined in the flattening step itself, and associated with the type of automobile in question.

Likewise, and in order to simplify manufacture as well as to distribute stresses symmetrically along the entire tubular body, the possibility of each pair of flattened areas defining a flattening plane, which coincides with the axis of symmetry of the tubular body, is contemplated.

Finally and as particular embodiments, the options of the material used for the tubular body are described, wherein the tubular body is preferably made of a metallic material, but it can also be made of a thermoplastic material or the like, provided that it complies with the essential physical entities and assures high strength, low weight, ease of manufacture and a high degree of flexibility.

A stabilizer link for automobile suspensions is therefore obtained with the proposed invention, said stabilizer link being capable of assuring a secure and reliable attachment between the automobile wheel suspension and the stabilizer bar associated with the automobile suspension system, having a series of simple physical entities which significantly reduce the manufacturing cost compared with the current state of the art, in addition to assuring a secure and immediate attachment of the wheel suspension system and the stabilizer bar, all with a simple, flexible and very versatile device so that it can be coupled to the multiple configurations of different automobiles suspensions.

BRIEF DESCRIPTION OF THE SEVERAL VIEWS OF THE DRAWINGS

To complement the description that is being made and for the purpose of aiding to better understand the features of the invention according to a preferred practical embodiment thereof, a series of drawings is attached as an integral part of said description in which the following has been depicted in an illustrative and non-limiting manner:

FIG. 1 shows a two-dimensional view of an embodiment of the invention, wherein FIG. 1(A) is a cross-section taken along section line A-A in FIG. 1(B), and where FIG. 1(B) is an elevational view.

DETAILED DESCRIPTION OF THE INVENTION

Figure 1:
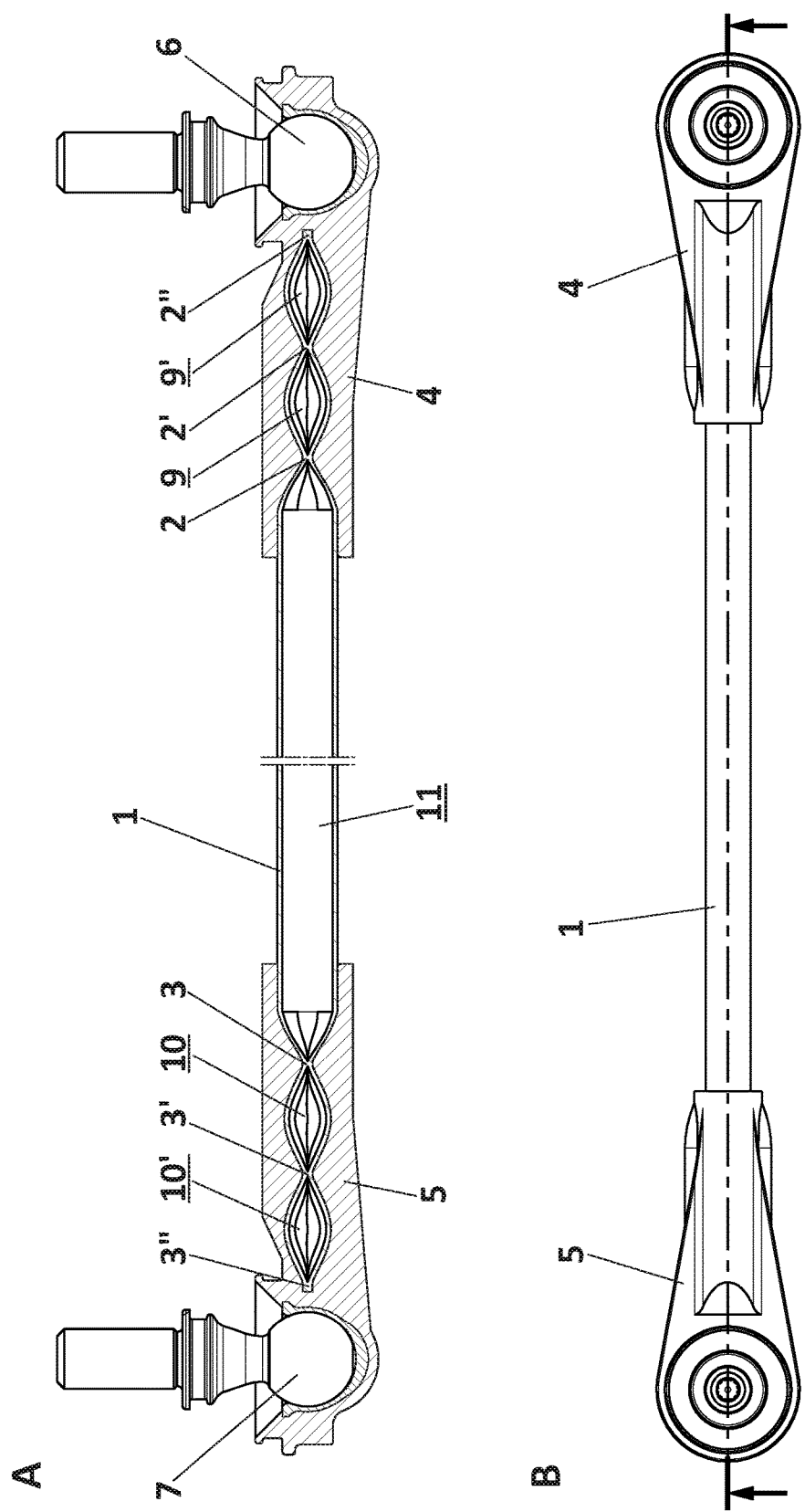

In a first embodiment, the stabilizer link for automobile suspensions object of the invention comprises:
a tubular body (1) which has a pair of first flattened areas (2, 2') located at one end of said tubular body (1) configuring a leak-tight closure of a first inner cavity (9) of the tubular body (1) located between both flattened areas (2, 2');
a first covering (4) made of polymeric material coupled, during the forming process thereof, on the end of the tubular body (1), surrounding said pair of first flattened areas (2, 2') and wherein said covering (4) comprises an articulation (6).

A second embodiment is then observed, in which the tubular body (1) has second flattened areas (3, 3') located at the opposite end of the tubular body (1) and surrounded by a second polymeric covering (5) comprising a second articulation (7), thereby configuring three leak-tight inner cavities of the tubular body (1):
the first inner cavity (9) of the tubular body (1) located between the first flattened areas (2, 2');
a second inner cavity (10) of the tubular body (1) located between the two second flattened areas (3, 3'); and
a third inner cavity (11) of the tubular body (1) located between the first flattened area (2) located at the first end and the second flattened area (3) located at the second end.

It is also possible to arrange, in the vicinities of the flattened areas (2', 3'), a third flattened area (2") and a fourth flattened area (3") configuring, respectively, a fourth inner cavity (9') and a fifth inner cavity (10'), arranged respectively between the first flattened area (2') and the third flattened area (2"), and between the second flattened area (3') and the fourth flattened area (3").

The possibility of performing a machining process, such as machining or shot-blasting, on at least one of the ends of the tubular body (1) is contemplated, said machining spanning from at least the flattened area (2, 3) farthest away from the free end of the tubular body (1) to said free end of the tubular body.

It is also possible to arrange a slide bushing in the polymeric coverings (4, 5) before the articulations (6, 7).

Figure 2:
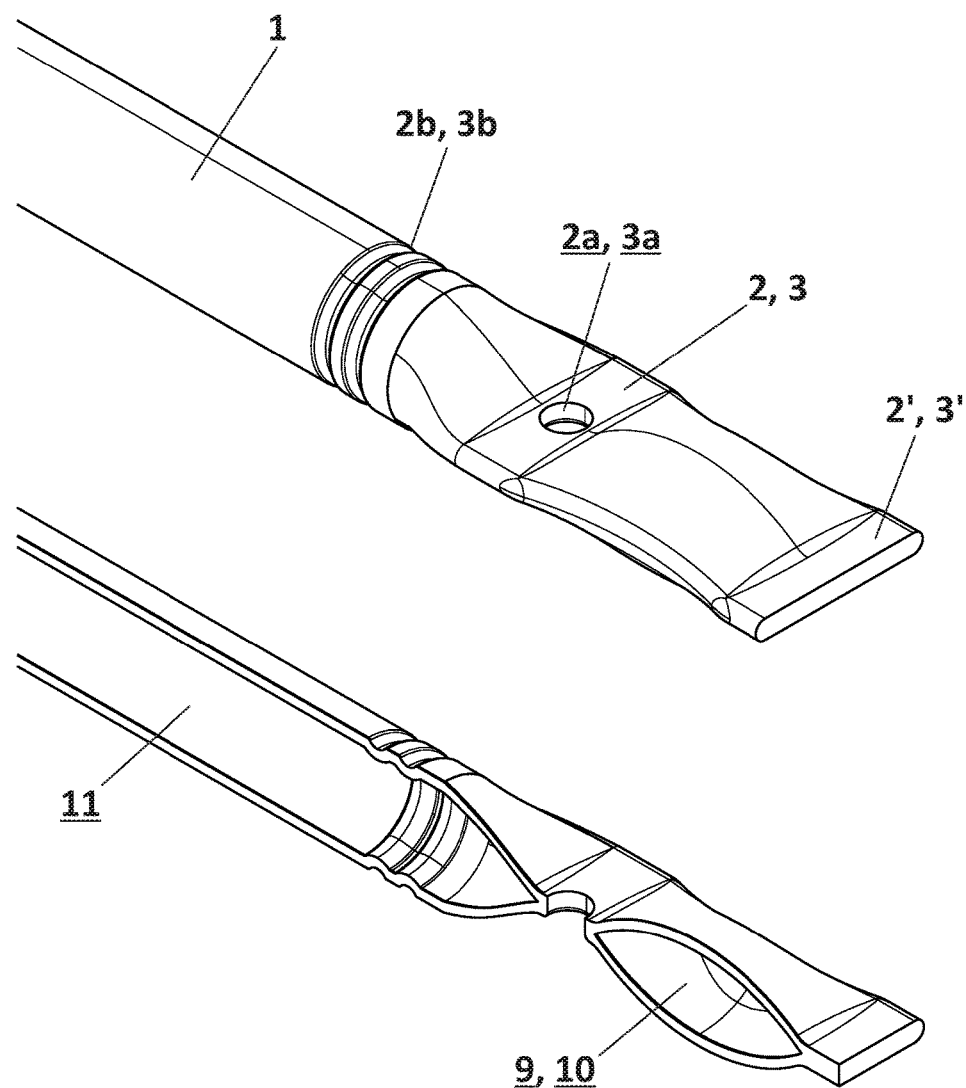
FIG. 2 shows two three-dimensional detail views of one end of the tubular body of the stabilizer link object of the invention in another embodiment in which at least one of the flattened areas has a through hole and in which a pair of perimetral grooves are located in the vicinity of said flattened areas.
Figure 3:
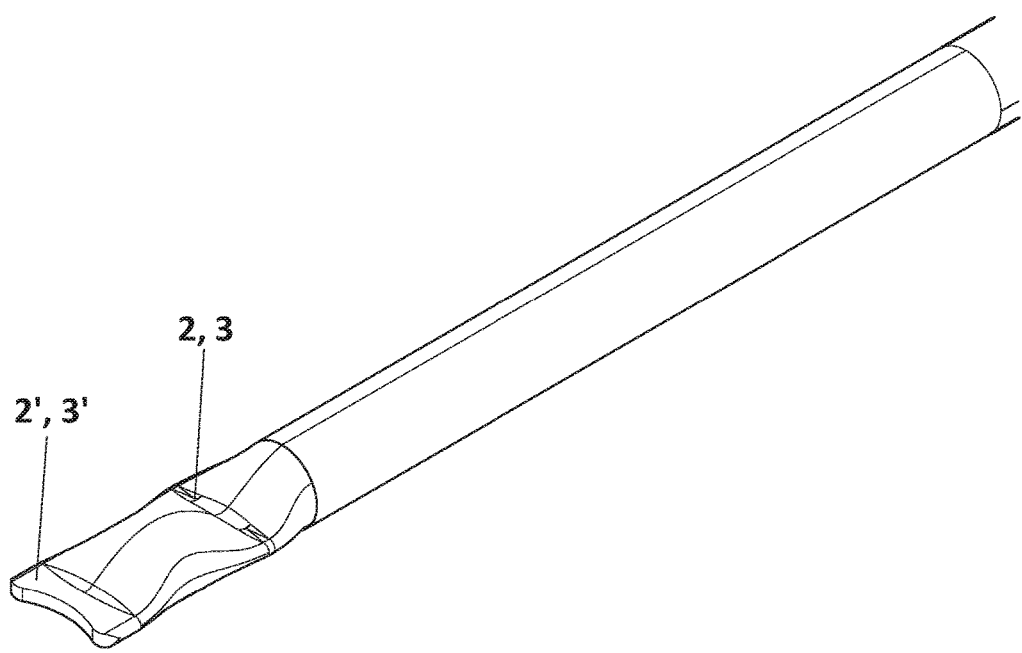
FIG. 3 shows a three-dimensional detail view of one end of the tubular body of the stabilizer link object of the invention in another embodiment in which at least one of the free ends has a concave recess.

The option of making flattened areas in any of the preceding embodiments such that the ends of the tubular body (1) are left free, i.e., open, is contemplated, this being a solution similar to that shown in FIGS. 1 to 3, but in which there is excess material at the ends of the tubular body (1) itself.

It can in turn be seen how each flattened area (2, 2', 2", 3, 3', 3") can have, respectively, one or more through holes (2a, 3a) which are configured to allow the coupling of the polymeric coverings (4, 5) thereon, since each covering (4, 5) is coupled to its respective flattened area through both coverings (4, 5) surrounding each through hole (2a, 3a) of said flattened areas.

In order to increase the binding and gripping capacity of the polymeric coverings (4, 5) on the tubular body (1), FIG. 2 shows how the tubular body (1) can have a series of perimetral grooves (2b, 3b) configured for being surrounded by each polymeric covering (4, 5), and wherein said perimetral grooves (2b, 3b) are located in the proximities of the flattened areas (2, 3) of said tubular body (1).

Both the first pair of flattened areas (2, 2') and the second pair of flattened areas (3, 3') defining a flattening plane, wherein said planes are parallel to one another, and wherein both flattening planes coincide with the axis of symmetry of the tubular body (1), can also be contemplated as a possibility.

According to the embodiments that have been described, the processes of manufacturing said stabilizer links for automobile suspensions can be described, wherein the method comprises the following steps in the first embodiment:
a) cutting the tubular body (1) to a predetermined length;
b) making the pair of flattened areas (2, 2') at the first end of said tubular body (1);
c) coupling a mold covering said flattened areas (2, 2') of the tubular body (1), wherein said mold has an inner cavity suitable for being filled with a polymeric material;
d) pouring the polymeric material into said mold, said polymeric material surrounding the flattened areas (2, 2');
e) removing the mold once the polymeric material therein solidifies, resulting in a polymeric covering (4) at the flattened end; and
f) coupling the articulation (6) in the polymeric covering (4), each articulation (6) being configured for being coupled either in the stabilizer bar or in the suspension system.

In the case of the second embodiment, it is necessary to add in step b), making the second pair of flattened areas (3, 3') at the second end of the tubular body (1), such that the three cavities (9, 10, 11) mentioned above are obtained. For this case, steps c), d), e) and f) will take place as described but configuring two polymeric coverings (4, 5), each housing an articulation (6, 7).

Finally and according to another possible embodiment, three flattened areas (2, 2', 2") are made in step b) at the first end of the tubular body (1), there being the option of making three other flattened areas (3, 3', 3") at the second end of the tubular body (1).

In view of this description and set of drawings, the person skilled in the art will be able to understand that the embodiments of the invention that have been described can be combined in many ways within the object of the invention. The invention has been described according to several preferred embodiments thereof, but for the person skilled in the art it will be obvious that multiple variations can be introduced in said preferred embodiments without exceeding the object of the claimed invention.

PARTS LIST

The following is a list of parts and materials suitable for use in the present invention:

| Parts Number | Description |
| --- | --- |
| 1 | tubular body |
| 2 | one of pair of first flattened areas |
| 2' | one of pair of first flattened areas |
| 2" | third flattened area |
| 2a | hole |

-continued

| Parts Number | Description |
| --- | --- |
| 2b | perimetral groove |
| 3 | one of pair of second flattened areas |
| 3' | one of pair of second flattened areas |
| 3" | fourth flattened area |
| 3a | hole |
| 3b | perimetral groove |
| 4 | first covering |
| 5 | second covering |
| 6 | first articulation |
| 7 | second articulation |
| 9 | first inner cavity |
| 9' | fourth inner cavity |
| 10 | second inner cavity |
| 10' | fifth inner cavity |
| 11 | third inner cavity |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. Stabilizer link for automobile suspensions, characterized in that it comprises:
   a tubular body (1) having ends, having at one of its ends a pair of first flattened areas (2, 2') configuring a leak-tight closure of a first inner cavity (9) of the tubular body (1) located between both flattened areas (2, 2');
   a first covering (4) made of polymeric material coupled, during a forming process thereof, on one of the ends of the tubular body (1) such that it surrounds the pair of first flattened areas (2, 2') and wherein said covering (4) comprises a first articulation (6).

2. Stabilizer link for automobile suspensions according to claim 1, comprising a pair of second flattened areas (3, 3'), located at the end opposite the end where the first flattened areas (2, 2') are placed and jointly configuring a second inner cavity (10) of the tubular body (1) and a third inner cavity (11) of the tubular body (1), arranged between the flattened areas (2, 3), said second flattened areas (3, 3') being surrounded by a second covering (5) made of polymeric material that is coupled during the forming process and comprises a second articulation (7).

3. Stabilizer link for automobile suspensions according to claim 2, wherein at least one of the coverings (4, 5) comprises a slide bushing in which one of the articulations (6, 7) is housed.

4. Stabilizer link for automobile suspensions according to claim 2, comprising a flattened area (2") located in proximity of the first flattened area (2') and configuring a leak-tight, fourth inner cavity (9') of the tubular body (1).

5. Stabilizer link for automobile suspensions according to claim 4, comprising a flattened area (3") located in proximity of the second flattened area (3') and configuring a leak-tight fifth inner cavity (10') of the tubular body (1).

6. Stabilizer link for automobile suspensions according to claim 5, wherein at least one of the flattened areas (2, 2', 2", 3, 3', 3") has at least one through hole (2a, 3a).

7. Stabilizer link for automobile suspensions according to claim 2, wherein at least one of the ends of the tubular body (1) is shot-blasted or sand-blasted from the flattened area (2, 3) farthest away from the end to the end of the tubular body (1).

8. Stabilizer link for automobile suspensions according to claim 2, wherein the coverings (4, 5) form a single body surrounding at least part of an outer surface of the tubular body (1).

9. Stabilizer link for automobile suspensions according to claim 2, wherein the tubular body (1) has at least one perimetral groove (2b, 3b) located in proximities of the flattened areas (2, 3) of said tubular body (1).

10. Stabilizer link for automobile suspensions according to claim 2, wherein the pair of first flattened areas (2, 2') and the pair of second flattened areas (3, 3') each define a flattening plane, wherein said planes are parallel to one another.

11. Stabilizer link for automobile suspensions according to claim 2, wherein the pair of first flattened areas (2, 2') and the pair of second flattened areas (3, 3') each define a flattening plane, wherein said planes form an angle with one another.

12. Stabilizer link for automobile suspensions according to claim 2, wherein the tubular body has free ends, and at least one free end of the tubular body (1) comprises a concave recess configured for being coupled to an articulation (6, 7).

13. Stabilizer link for automobile suspensions according to claim 1, wherein the tubular body has free ends, and at least one of the free ends of the tubular body (1) is open.

14. Stabilizer link for automobile suspensions according to claim 1, wherein the tubular body (1) comprises a central cross section which is circular or polygonal.

* * * * *